US006945889B2

(12) United States Patent
Markley et al.

(10) Patent No.: US 6,945,889 B2
(45) Date of Patent: Sep. 20, 2005

(54) HYDRAULIC CHAIN TENSIONER

(75) Inventors: George L. Markley, Montour Falls, NY (US); J. Christian Haesloop, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 124 days.

(21) Appl. No.: 10/264,809

(22) Filed: Oct. 4, 2002

(65) Prior Publication Data

US 2004/0067806 A1 Apr. 8, 2004

(51) Int. Cl.[7] .................................................. F16H 7/08
(52) U.S. Cl. ........................ 474/110; 474/109; 474/111
(58) Field of Search ........................... 474/109–111, 91, 474/140, 138; 137/854, 846, 102, 493.1

(56) References Cited

U.S. PATENT DOCUMENTS 3,941,149 A * 3/1976 Mittleman .................. 137/846
4,084,606 A * 4/1978 Mittleman .................. 137/102
4,507,103 A * 3/1985 Mittermeier ................ 474/110
4,921,472 A 5/1990 Young ........................ 474/111
4,997,411 A * 3/1991 Breon et al. ................ 474/110
5,314,388 A 5/1994 Suzuki et al. ............... 474/110
5,507,318 A * 4/1996 Israelson .................... 137/854
5,647,811 A 7/1997 Mott .......................... 474/111
5,718,650 A 2/1998 Smith et al. ................ 474/110
5,720,684 A * 2/1998 Mott .......................... 474/110
5,776,024 A 7/1998 White et al. ................ 474/110
5,868,638 A 2/1999 Inoue et al. ................ 474/110
5,911,641 A 6/1999 Sheren et al. ............... 474/109
5,967,921 A 10/1999 Simpson et al. ............ 474/110
5,989,139 A * 11/1999 Dusinberre et al. ......... 474/110
6,120,402 A * 9/2000 Preston et al. .............. 474/109
6,193,623 B1 * 2/2001 Koch et al. ................. 474/110
6,244,981 B1 * 6/2001 Simpson ..................... 474/110
6,312,351 B1 11/2001 Simpson et al. ............ 474/110
6,383,103 B1 * 5/2002 Fujimoto et al. ........... 474/110
6,398,682 B1 * 6/2002 Suzuki et al. ............... 474/110
6,435,993 B1 * 8/2002 Tada .......................... 474/110
6,592,479 B2 * 7/2003 Nakakubo et al. .......... 474/110
2001/0009876 A1 7/2001 Kurohata .................... 474/110
2001/0009877 A1 7/2001 Kurohata .................... 474/110
2001/0011047 A1 8/2001 Suzuki ....................... 474/101
2001/0039223 A1 11/2001 Wakabayaski et al. ...... 474/111
2002/0006840 A1 1/2002 Kurohata .................... 474/110
2002/0006841 A1 1/2002 Simpson et al. ............ 474/110

FOREIGN PATENT DOCUMENTS

DE 4319229 A1 12/1993 ........... F15B/15/08
DE 19500940 C1 7/1996 ............. F16H/7/08
DE 19646488 A1 5/1997 ............. F16H/7/08
DE 19717360 A1 10/1997 ............. F16H/7/08
DE 10007478 A1 8/2000 ............. F16H/7/08
WO WO 88/09867 A1 * 12/1988 .......... F02M/37/10

OTHER PUBLICATIONS

Southern Oregon Hot Bikes; http://www.schotbikes.com/tension.htm; 3 pages.

* cited by examiner

*Primary Examiner*—Marcus Charles
(74) *Attorney, Agent, or Firm*—Brown & Michaels, PC; Greg Dziegielewski

(57) ABSTRACT

The present invention comprises a hydraulic tensioner for applying tension to a chain without external fluid pressure supply. The hydraulic tensioner includes a piston assembly comprising a piston with a hollow interior and a piston bore surrounding the piston. An end of the piston assembly is submerged in fluid. An inlet check valve, which controls an entry of fluid into the piston, is located below the fluid level. An outlet check valve, located at an opposite end of the piston assembly from the inlet check valve, controls an exit of fluid from the piston. A non-return mechanism is coupled to the piston such that the piston extends but does not retract more than an included backlash amount. Utilizing the motion allowed within this backlash amount, the tensioner acts as a self-priming pump.

15 Claims, 6 Drawing Sheets

PRIOR ART

HYDRAULIC CHAIN TENSIONER

BACKGROUND OF THE INVENTION

1. Field of the Invention

The present invention relates generally to tensioners used with chain drives in automotive timing and power transmission applications. In particular, the present invention is related to a hydraulic chain tensioner system.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

To accomplish this result, a hydraulic tensioner typically comprises a rod or cylinder as a piston, which is biased in the direction of the chain by a tensioner spring. The piston is housed within a cylindrical housing, having an interior space which is open at the end facing the chain and closed at the other end. The interior space of the housing contains a pressure chamber in connection with a reservoir or exterior source of hydraulic fluid pressure. The pressure chamber is typically formed between the housing and the piston, and it expands or contracts when the piston moves within the housing.

Typically, valves are employed to regulate the flow of fluid into and out of the pressure chamber. For instance, an inlet check valve typically includes a ball-check valve that opens to permit fluid flow in to the pressure chamber when the pressure inside the chamber has decreased as a result of outward movement of the piston. When the pressure in the pressure chamber is high, the inlet check valve closes, preventing fluid from exiting the pressure chamber. The closing of the inlet check valve prevents the piston chamber from contracting, which in turn prevents the piston from retracting, achieving a so-called "no-return" function.

Many tensioners also employ a pressure relief mechanism that allows fluid to exit the pressure chamber when the pressure in the chamber is high, thus allowing the piston to retract in response to rapid increases in chain tension. In some tensioners, the pressure relief mechanism is a spring biased check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A hydraulic tensioner as used with a tensioner arm or shoe is shown in Simpson et al., U.S. Pat. No. 5,967,921, incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction.

Blade and block tensioners have been used in the past to apply tension to chains. A block tensioner (1) as known in the prior art is shown in FIG. 1. The tensioner (1) has a piston (2) located within a housing (5). The springs (3) are located in a fluid chamber (4) within the piston (2).

An example of a blade tensioner is shown in FIG. 2. The conventional blade tensioner (10) includes a blade shoe (11) made of resin having a curved chain sliding face and numerous blade springs (21) preferably made of metallic material. The blade springs (21) are arranged in layers on the opposite side of the blade shoe (11) from the chain sliding face, and provide spring force to the blade shoe (11). The ends of each spring-shaped blade spring (21) are inserted in the indented portions (14) and (15) which are formed in the distal portion (12) and proximal portion (13) of the blade shoe (11), respectively.

A bracket (17) is provided for mounting the blade tensioner (10) in an engine. Holes (18) and (19) are formed in the bracket (17), and mounting bolts are inserted into these holes (18) and (19). A sliding face (16) contacts the distal portion of the blade shoe (11) and permits sliding. The slide face (16) is formed on the distal portion of the bracket (17). A pin (20) supports the proximal portion (13) of the blade shoe (11) so that it may move in either direction. The pin (20) is secured in the center of the bracket (17).

U.S. Pat. No. 5,647,811, shows a chain tensioner with an integrated tensioner and arm. The hydraulic tensioner in that patent is pressure fed.

Due to space restrictions, functionality or numerous other reasons, common tensioners such as the block type tensioners (FIG. 1) and blade type tensioners (FIG. 2) discussed above cannot be used in some applications. Therefore, there is a need in the art for an improved tensioner which can overcome the prior art shortcomings.

SUMMARY OF THE INVENTION

The present invention comprises a hydraulic tensioner for applying tension to a chain without external fluid pressure supply. The hydraulic tensioner includes a piston assembly comprising a piston with a hollow interior and a piston bore surrounding the piston. An end of the piston assembly is submerged in fluid. An inlet check valve, which controls an entry of fluid into the piston, is located below the fluid level. An outlet check valve, located at an opposite end of the piston assembly from the inlet check valve, controls an exit of fluid from the piston. A non-return mechanism is coupled to the piston such that the piston extends but does not retract more than an included backlash amount. Utilizing the motion allowed within this backlash amount, the tensioner acts as a self-priming pump.

DETAILED DESCRIPTION OF THE INVENTION

Figure 1:
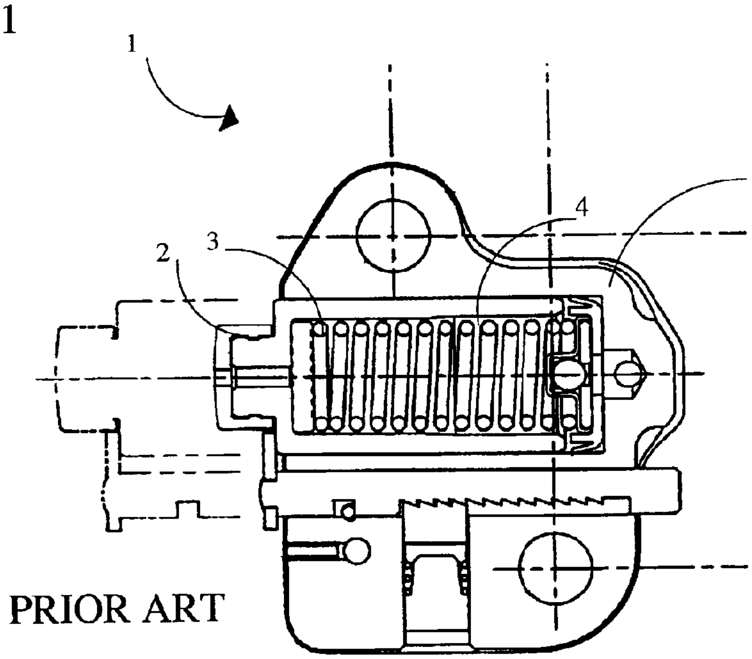
FIG. 1 shows a block tensioner as known in the prior art.
Figure 2:
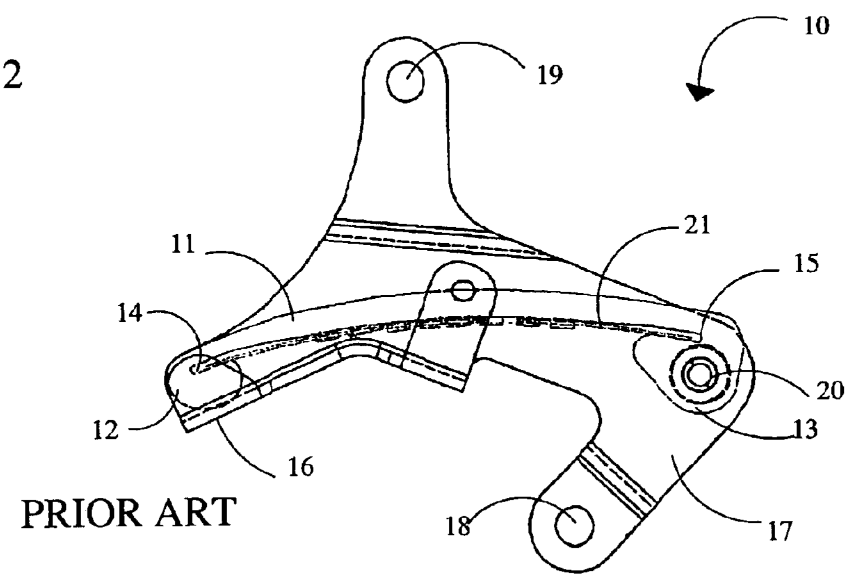
FIG. 2 shows a blade tensioner as known in the prior art.

In some of the applications where the prior art tensioners of FIGS. 1 and 2 could not be used, a tensioner arm incorporating a spring-loaded piston pushing against a stationary object would suffice. However, the limitation of a spring loaded piston is that the spring force to overcome peak chain loading and to maintain chain control causes excessive chain wear.

Figure 3:
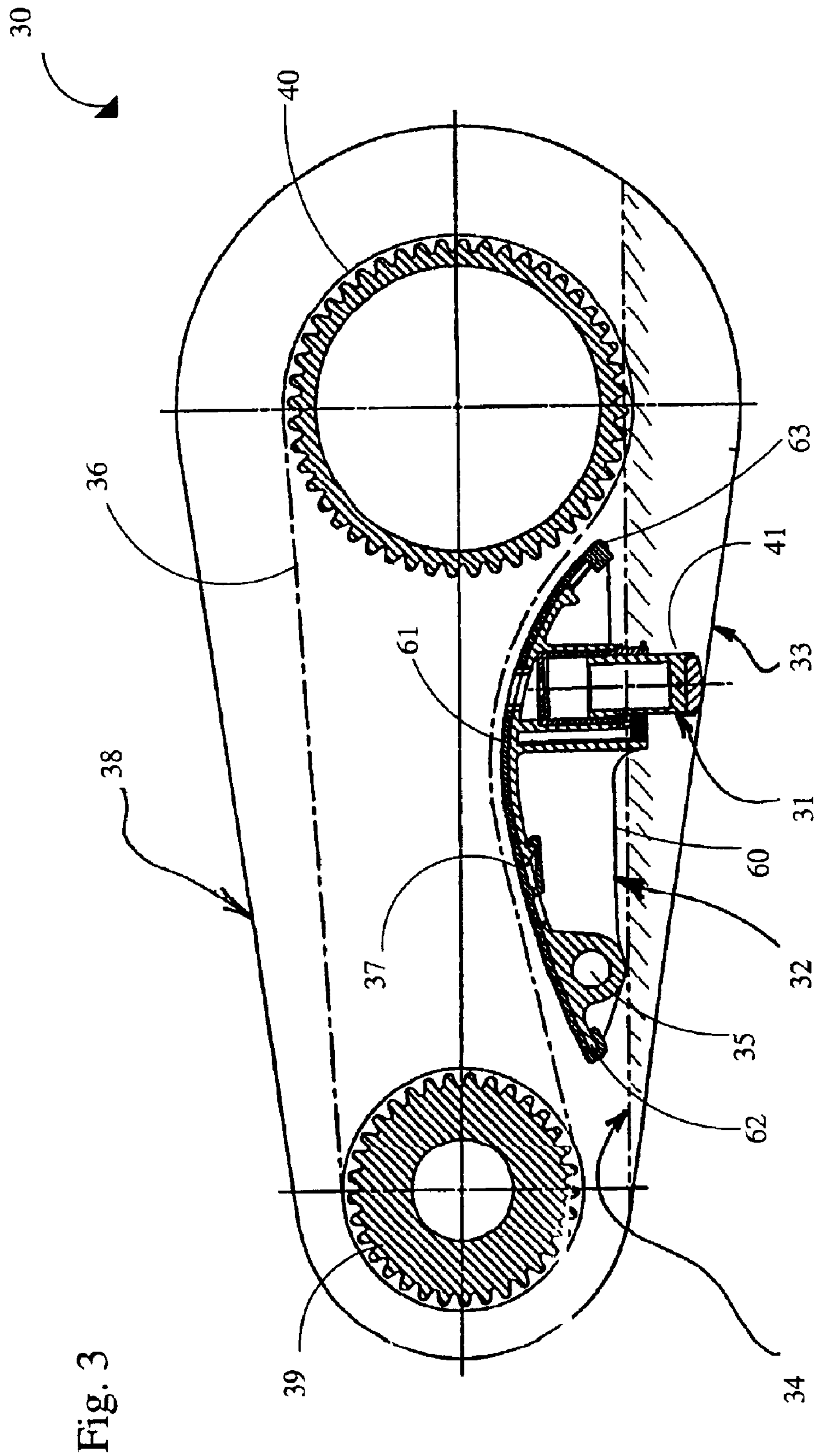
FIG. 3 shows a hydraulic tensioner of the present invention.
Figure 4:
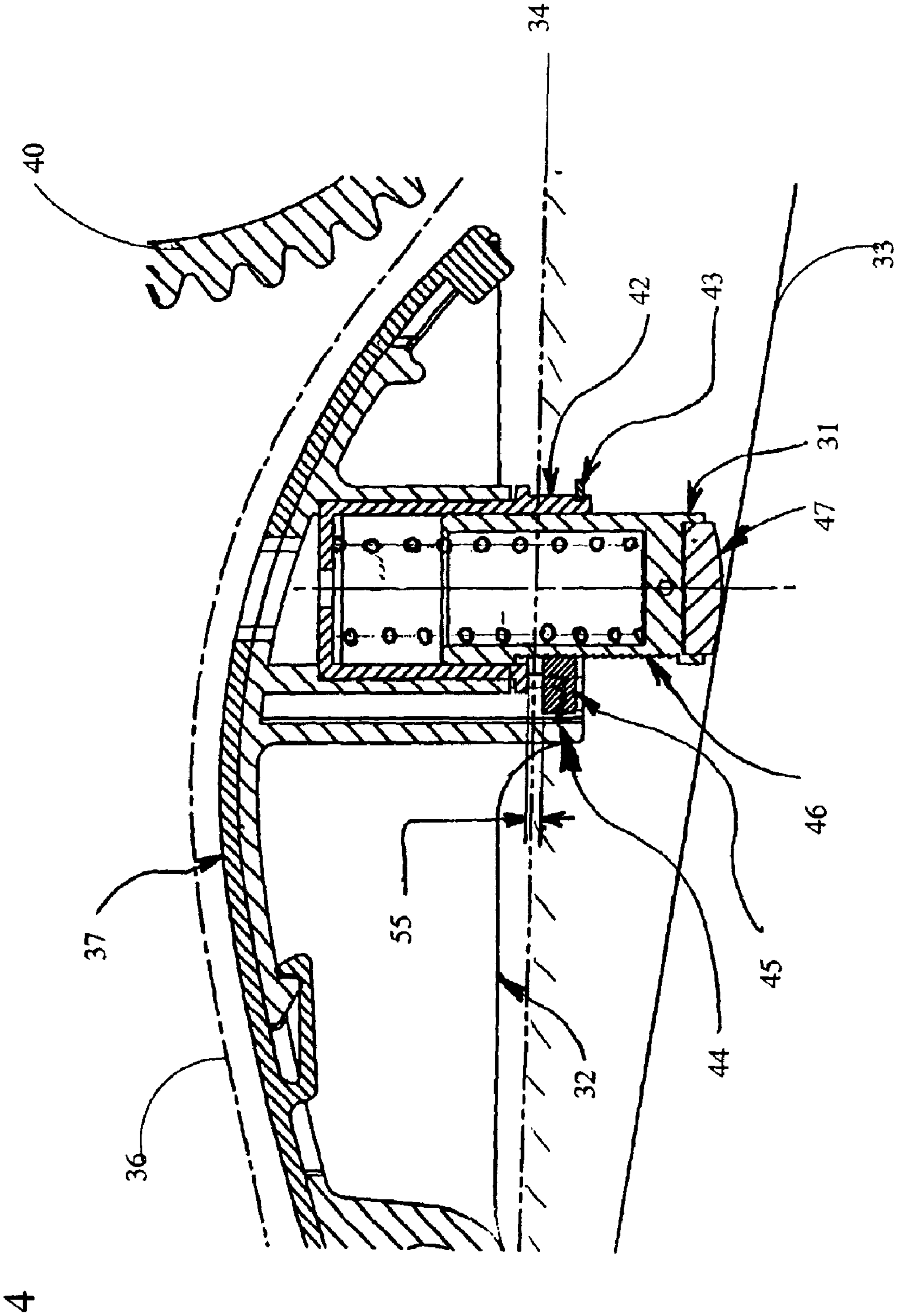
FIG. 4 shows a blown up view of the tensioner arm in FIG. 3.
Figure 5:
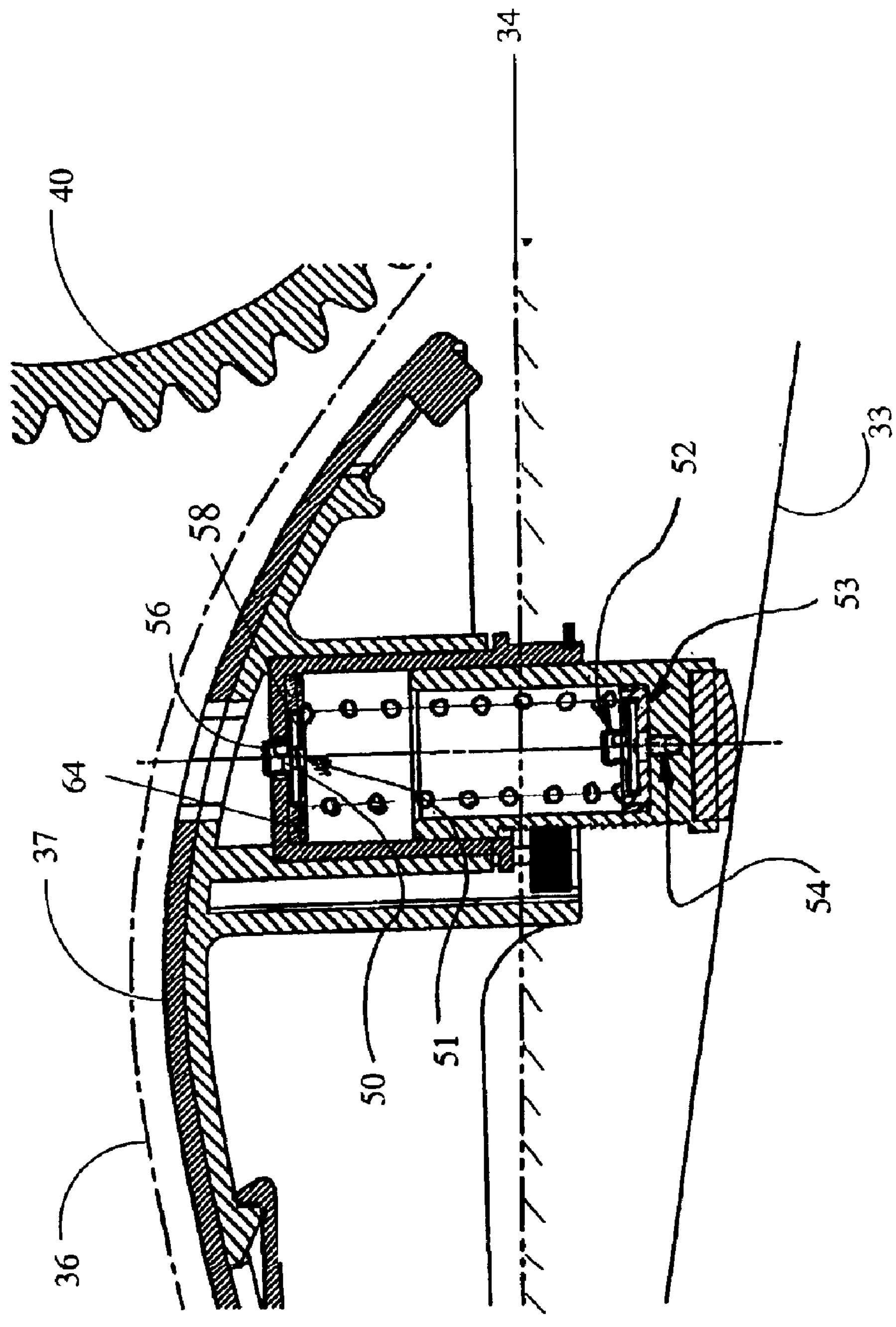
FIG. 5 shows another blown up view of the tensioner arm in FIG. 3.

Referring now to FIGS. 3 through 5, a preferred embodiment of the present invention is shown. A power transmission device (30) comprises a chain (36) or belt (not shown) operating between two sprockets (39) and (40). A case (38) preferably encloses the device and also acts as an abutment (33) for a piston (31), which is preferably springloaded. The chain sliding face (37) of a tensioner arm (32) mounted on a pivot (35) presses against the chain (36) to maintain tension.

The tensioner arm (32) has a first side (60) and a second side (61) spaced from the first side. A first end (62) is disposed between the first (60) and second (61) sides. A second end (63) is disposed between the first (60) and second (61) sides, and spaced from the first end (62). Preferably, the first (62) and second (63) ends join the first and second sides. The second side (61) provides the chain sliding face (37) which is in contact with the chain (36) to be tensioned. Preferably, the second side (61) is arcuately shaped to provide a suitable chain travel surface. Of course, it will be understood by one skilled in the art that the second side (61) can have any suitable shape as dictated by manufacturing and consumer preference concerns.

The tensioner arm (32) may be made from any material that meets all structural, environmental, wear and durability criteria. Materials such as steel, aluminum and plastics are preferably used as well as composites such as glass filled nylon.

The chain sliding face (37) of a tensioner arm (32) may be made from any durable wear resistant material. A synthetic material, such as nylon, which has high wearability and durability characteristics can be used. In particular, Nylon 6/6 is one commercially available material that may be used. Alternatively, the chain sliding face may be made of PEEK (polyetheretherketone), which also has high wearability and durability characteristics. One of ordinary skill in the art would be capable of selecting one of these or other numerous suitable materials.

The hydraulic tensioner (41) includes the piston (31), which applies force to the tensioner arm (32). In a preferred embodiment, the tensioner (41) is combined and incorporated into the tensioner arm (32) for improved packaging. The tensioning device extends from the tensioner arm (32). The button, or bottom end (47) of the piston contacts a stationary abutment (33). This contact forces the arm (32) away from the abutment (33) and into the chain path, causing tension.

A non-return mechanism coupled to the piston (31) ensures that the piston (31) extends but does not retract more than an included backlash (55) amount. Non-return mechanisms take up worn chain slack to prevent sprocket tooth jump of the chain. In a preferred embodiment, the non-return mechanism is a ratcheting mechanism, but it will be understood by one skilled in the art that other non-return mechanisms are possible within the teachings of the invention, such as a cam, roller wedge or sprague mechanism, or rod-and-catch plate arrangement. The ratchet teeth (46) are located on the side of the piston (31), engaging ratchet teeth on a pawl (45) (see FIG. 4). A spring (44) is preferably located within the pawl (45) to maintain engagement of the pawl (45) to the ratchet teeth (46). The pawl (45) moves in and out along the axis of the spring (44). The pawl (45) motion is restricted to allow the piston (31) to extend but not retract except for the included backlash (55) amount. The pawl (45) prevents excessive chain motion due to peak chain loads or insufficient hydraulic pressure.

Applying the above concept in an application using oil bath chain lubrication allows an end of the tensioning piston (31) to be submerged in the fluid bath. As shown in the figures, the fluid level (34) is above the extended portion of the piston (31).

A fluid inlet passageway (54) feeding an inlet check valve (52) is located in the submerged end of the piston (31) (see FIG. 5). A seal (53) ensures that there is little or no leakage. An outlet flow control, shown as check valve (50) and an outlet passageway (56) is located in the insert (42) at the other end of the piston-insert chamber. The outlet flow control prevents air entry when the piston extends, and permits controlled fluid outflow when the piston retracts. As long as the inlet check valve (52) is submerged in fluid, the inlet check valve (52) could alternatively be located in the insert (42) and the outlet flow control (50) could alternatively be located in the piston (31). A seal (64) ensures that there is little or no leakage.

The included backlash amount in the non-return mechanism, combined with the inlet check valve and outlet flow control in the piston, allows the tensioner to act as a self priming (purging) pump, without the need for an external fluid pressure supply. If the outlet passageway (56) is further restricted with an orifice (51) or tortuous path (58) or the like, the action of the hydraulic tensioner will be damped. In some applications, a tortuous path (58) alone can act as an outlet flow control.

A retaining ring (43) is preferably located on a side of the insert (42) to contain the pawl (45) and a spring (44) when the piston (31) extends. The pawl (45) is preferably slidably connected to the tensioner arm and contained by the retaining ring (43). In a preferred embodiment, the pawl (45) is guided in a channel, which is preferably U-shaped. The pawl (45) slides up and down in the channel.

Figure 6:
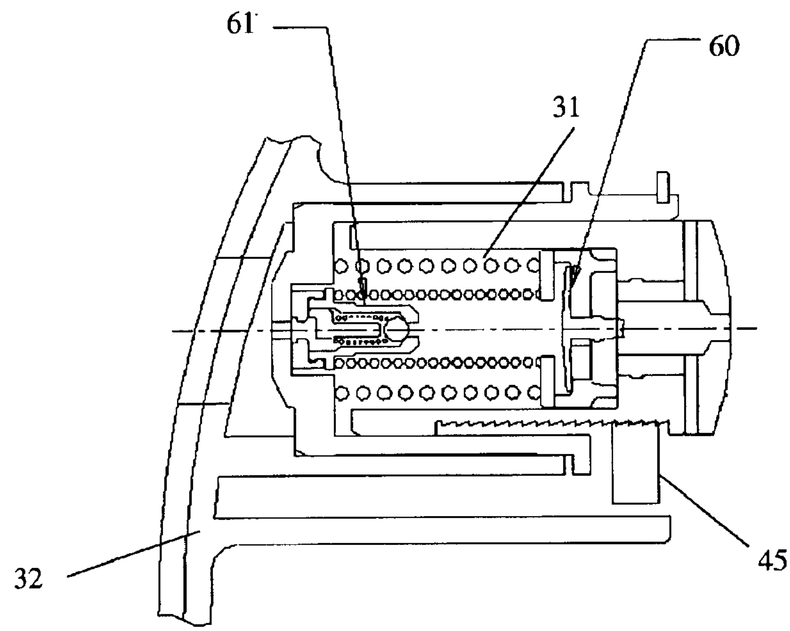
FIG. 6 shows a preferred embodiment of the hydraulic tensioner of the present invention.
Figure 7:
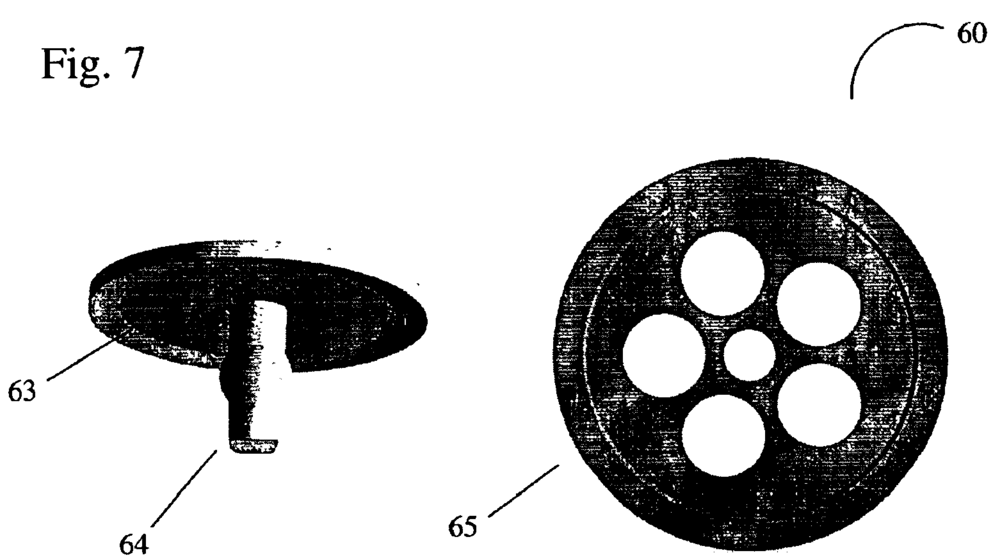
FIG. 7 shows a blown up view of the umbrella check valve shown in FIG. 6.
Figure 8:
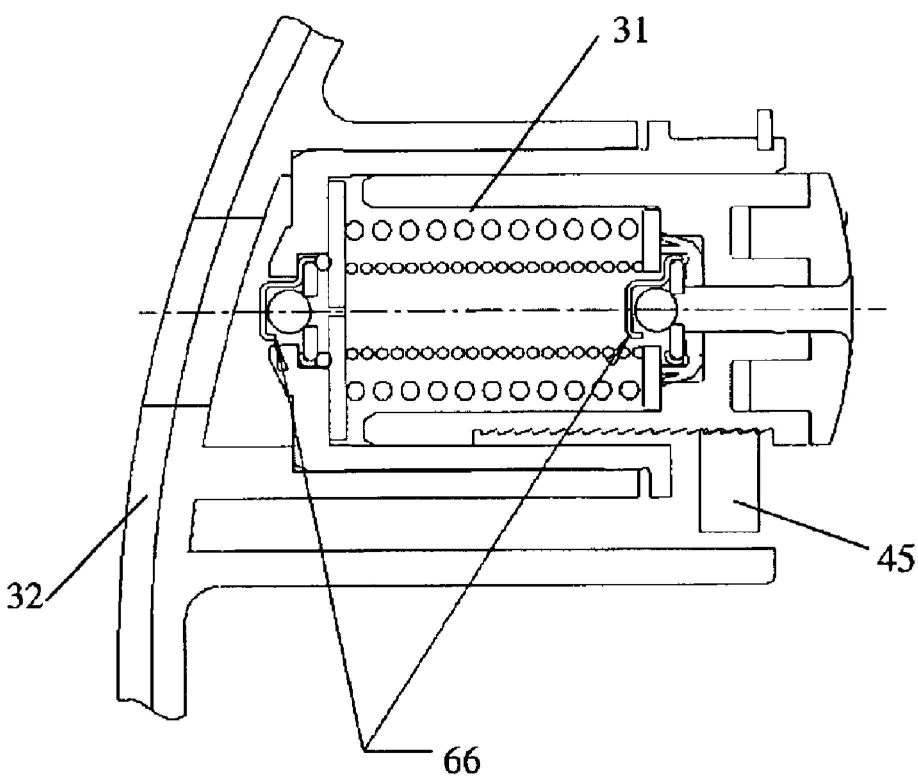
FIG. 8 shows' another preferred embodiment of the hydraulic tensioner of the present invention.

In one example of the invention, shown in FIGS. 6 and 7, the inlet check valve is an umbrella check valve (60). The umbrella check valve (60) includes a skirt (63), a stem (64), and a seat (65). In this example, the outlet flow control is preferably a pressure relief valve (61). The pressure relief valve (61) allows fluid to exit the piston (31) when the pressure in the piston (31) is high, thus allowing the piston to retract in response to rapid increases in chain tension. In another example, shown in FIG. 8, the inlet check valve and the outlet flow control are both ball check valves (66).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for applying tension to a chain without external fluid pressure supply, comprising:

a) a piston assembly comprising:
   i) a piston (31) with a hollow interior and an insert (42) surrounding the piston (31);
   ii) an inlet check valve (52) for controlling an entry of fluid into the piston, located such that when an end of the piston assembly is submerged in fluid, the inlet check valve permits fluid flow into the hollow interior; and
   iii) an outlet check valve (50) for preventing air entry when the piston extends and permitting controlled fluid outflow when the piston retracts, located at an opposite end of the piston assembly from the inlet check valve (52);

b) a non-return mechanism coupled to the piston (31) such that the piston (31) extends but does not retract more than an included backlash (55) amount; and c) an inlet passageway (54) from the interior to the exterior of the piston (31), wherein the inlet passageway (54) is connected to the inlet check valve;

wherein the tensioner is mounted such that the inlet passageway is located below the fluid level when the end of the piston assembly is submerged in fluid; and wherein the tensioner lifts fluid into the tensioner due to piston motion within the included backlash amount, action of the inlet check valve, and action of the outlet check valve, to fill an interior of the tensioner without an external fluid pressure supply.

2. The tensioner of claim 1, wherein the non-return mechanism comprises:

a) a plurality of ratchet teeth (46) formed along a length of the piston (31); and b) a pawl (45) disposed adjacent to the piston (31), wherein the pawl (45) comprises a plurality of ratchet teeth which engage the ratchet teeth (46) on the piston (31).

3. The tensioner of claim 1, further comprising an outlet passageway (56) from the interior to the exterior of the piston (31), wherein the outlet passageway is connected to the outlet check valve.

4. The tensioner of claim 3, wherein the outlet passageway (56) is shaped such that the tensioner acts as a hydraulic tensioner with damping.

5. The tensioner of claim 3, wherein the outlet passageway comprises an orifice (51), which restricts the outlet passageway.

6. The tensioner of claim 3 wherein the outlet passageway comprises a tortuous path, which restricts the outlet passageway.

7. The tensioner of claim 1, further comprising a tensioner arm (32) having a chain side (37) that contacts a chain (36) to be tensioned, wherein the hydraulic tensioner is disposed in the tensioner arm.

8. The tensioner of claim 7, further comprising a stationary abutment (33) which contacts an extended end of the piston (31) such that the tensioner arm (32) is pushed away from the stationary abutment (33) and into a path of the chain (36).

9. The tensioner of claim 1, wherein the inlet check valve (52) is located in the piston (31) and the outlet check valve (50) is located in the insert (42).

10. The tensioner of claim 1, wherein the inlet check valve (52) is located in the insert (42) and the outlet check valve (50) is located in the piston (31).

11. The tensioner of claim 1, wherein the inlet check valve is an umbrella check valve (60).

12. The tensioner of claim 1, wherein the inlet check valve is a ball check valve (66).

13. The tensioner of claim 1, wherein the outlet check valve comprises a ball check valve (66).

14. The tensioner of claim 1, wherein, when the end of the piston assembly is submerged in fluid, the inlet check valve is located below the fluid level.

15. A method of applying tension to a chain without external fluid pressure supply, comprising the steps of:

a) providing a tensioner comprising:
   i) a piston assembly comprising:
      A) a piston (31) with a hollow interior and an insert (42) surrounding the piston (31);
      B) an inlet check valve (52) for controlling an entry of fluid into the piston, located such that when an end of the piston assembly is submerged in fluid, the inlet check valve permits fluid flow into the hollow interior; and
      C) an outlet check valve (50) for preventing air entry when the piston extends and permitting controlled fluid outflow when the piston retracts, located at an opposite end of the piston assembly from the inlet check valve (52); and
   ii) a non-return mechanism coupled to the piston (31) such that the piston (31) extends but does not retract more than an included backlash (55) amount;

b) submerging an inlet end of the tensioner in a fluid supply such that an inlet passageway is under a level of the fluid supply;

c) self-priming the tensioner, wherein the tensioner lifts the fluid supply into the tensioner due to piston motion within the included backlash amount, action of the inlet check valve, and action of the outlet check valve, to fill an interior of the tensioner without an external fluid pressure supply.

* * * * *